(12) United States Patent
Hatamoto

(10) Patent No.: US 8,661,061 B2
(45) Date of Patent: Feb. 25, 2014

(54) DATA STRUCTURE, DATA STRUCTURE GENERATION METHOD, INFORMATION PROCESSING APPARATUS, INFORMATION PROCESSING SYSTEM, AND COMPUTER-READABLE STORAGE MEDIUM HAVING STORED THEREIN INFORMATION PROCESSING PROGRAM

(75) Inventor: Minoru Hatamoto, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 0 days.

(21) Appl. No.: 13/477,718

(22) Filed: May 22, 2012

(65) Prior Publication Data

US 2013/0254201 A1  Sep. 26, 2013

(30) Foreign Application Priority Data

Mar. 21, 2012 (JP) ................................. 2012-064180

(51) Int. Cl.
*G06F 7/00* (2006.01)
*G06F 17/30* (2006.01)
(52) U.S. Cl.
USPC ........... 707/797; 707/778; 707/798; 707/829; 707/956
(58) Field of Classification Search
USPC .......................... 707/778, 797, 798, 829, 956
See application file for complete search history.

(56) References Cited

U.S. PATENT DOCUMENTS

| | | | |
|---|---|---|---|
| 5,799,299 A * | 8/1998 | Fujiwara | 707/999.003 |
| 6,047,283 A * | 4/2000 | Braun | 707/999.003 |
| 8,239,758 B2 * | 8/2012 | Jardine-Skinner et al. | 715/254 |
| 8,275,792 B2 * | 9/2012 | Minagawa et al. | 707/791 |
| 2004/0136407 A1 * | 7/2004 | Okamoto | 370/506 |
| 2005/0187900 A1 * | 8/2005 | LeTourneau | 707/1 |
| 2005/0246533 A1 * | 11/2005 | Gentry | 713/170 |
| 2006/0059333 A1 * | 3/2006 | Gentry et al. | 713/156 |
| 2006/0080626 A1 * | 4/2006 | Ohba et al. | 716/6 |
| 2010/0005096 A1 * | 1/2010 | Minagawa et al. | 707/6 |
| 2010/0122161 A1 * | 5/2010 | Jardine-Skinner et al. | 715/256 |
| 2011/0225165 A1 * | 9/2011 | Burstein | 707/741 |
| 2012/0226973 A1 * | 9/2012 | Jardine-Skinner et al. | 715/254 |

FOREIGN PATENT DOCUMENTS

JP  2011-257877  12/2011

* cited by examiner

*Primary Examiner* — Phong Nguyen
(74) *Attorney, Agent, or Firm* — Nixon & Vanderhye, P.C.

(57) ABSTRACT

A method for generating a tree-type data structure composed of a plurality of data strings includes the steps of: summing, with respect to a plurality of data strings classified in a parent node, the numbers of data types of data, respectively, at least one given string position in each of the plurality of data strings; and classifying, based on the numbers of the data types respectively summed at the at least one given string position in the summing step, the plurality of data strings into a plurality of child nodes, for the respective data types at a given string position.

11 Claims, 7 Drawing Sheets

| aaaaaaa ⟶ | 01100001 | 01100001 | 01100001 | 01100001 | 01100001 | 01100001 | 01100001 |
| aaaaaab ⟶ | 01100001 | 01100001 | 01100001 | 01100001 | 01100001 | 01100001 | 01100010 |
| aaaaabb ⟶ | 01100001 | 01100001 | 01100001 | 01100001 | 01100001 | 01100010 | 01100010 |
| aaaabbb ⟶ | 01100001 | 01100001 | 01100001 | 01100001 | 01100010 | 01100010 | 01100010 |
| aaabbbb ⟶ | 01100001 | 01100001 | 01100001 | 01100010 | 01100010 | 01100010 | 01100010 |
| aabbbbb ⟶ | 01100001 | 01100001 | 01100010 | 01100010 | 01100010 | 01100010 | 01100010 |
| abbbbbb ⟶ | 01100001 | 01100010 | 01100010 | 01100010 | 01100010 | 01100010 | 01100010 |
| bbbbbbb ⟶ | 01100010 | 01100010 | 01100010 | 01100010 | 01100010 | 01100010 | 01100010 |

| aaaaaaa ⟶ | 01100001 | 01100001 | 01100001 | 01100001 | 01100001 | 01100001 | 01100001 |
| aaaaaab ⟶ | 01100001 | 01100001 | 01100001 | 01100001 | 01100001 | 01100001 | 01100010 |
| aaaaabb ⟶ | 01100001 | 01100001 | 01100001 | 01100001 | 01100001 | 01100010 | 01100010 |
| aaaabbb ⟶ | 01100001 | 01100001 | 01100001 | 01100001 | 01100010 | 01100010 | 01100010 |
| aaabbbb ⟶ | 01100001 | 01100001 | 01100001 | 01100010 | 01100010 | 01100010 | 01100010 |
| aabbbbb ⟶ | 01100001 | 01100001 | 01100010 | 01100010 | 01100010 | 01100010 | 01100010 |
| abbbbbb ⟶ | 01100001 | 01100010 | 01100010 | 01100010 | 01100010 | 01100010 | 01100010 |
| bbbbbbb ⟶ | 01100010 | 01100010 | 01100010 | 01100010 | 01100010 | 01100010 | 01100010 |

| THE NUMBER OF 1S : | 80088871 | 80088862 | 80088853 | 80088844 | 80088835 | 80088826 | 80088817 |
| THE NUMBER OF 0S : | 08800017 | 08800026 | 08800035 | 08800044 | 08800053 | 08800062 | 08800071 |

DATA STRUCTURE, DATA STRUCTURE GENERATION METHOD, INFORMATION PROCESSING APPARATUS, INFORMATION PROCESSING SYSTEM, AND COMPUTER-READABLE STORAGE MEDIUM HAVING STORED THEREIN INFORMATION PROCESSING PROGRAM

CROSS REFERENCE TO RELATED APPLICATION

The disclosure of Japanese Patent Application No. 2012-064180, filed on Mar. 21, 2012 is incorporated herein by reference.

FIELD

The present embodiment relates to a data structure and the like, and more specifically, to a tree-type data structure composed of a plurality of data strings to be searched, and the like.

BACKGROUND AND SUMMARY

It is known that, in order to efficiently search information, a plurality of data strings to be searched are stored in a tree-type data structure using a patricia tree.

However, in a conventional tree-type data structure using a patricia tree, for example, in a case where a data string composed of a long character string is searched, there is a problem in that the search speed varies depending on the characteristic of the character string.

Specifically, as shown in FIG. 11, in a conventional data structure using a patricia tree, a tree is generated in which a branch is created for each common part, starting from the beginning of the character string. Therefore, in the case of a data set that includes character strings having many common characters in front portions thereof (that is, a data set that includes many character strings whose front portions resemble each other), the tree has an unbalanced shape, and the search speed becomes unstable and varies depending on the character string. For example, in FIG. 11, a character string 'aaaaaaa' is identified through seven branches, whereas a character string 'bbbbbbb' is identified through one branch. Therefore, when searching the character string 'aaaaaaa', the search speed decreases, and when searching the character string 'bbbbbbb', the search speed increases. In this manner, the search speed is unstable.

Therefore, a main object of the present embodiment is to provide a data structure generation method and the like that realizes a stable search speed independently of the characteristics of data strings.

In order to solve the above problem, the present embodiment has employed the following configurations.

One aspect of the generation method according to the present embodiment is a method for generating a tree-type data structure composed of a plurality of data strings. The method includes the steps of: summing, with respect to a plurality of data strings classified in a parent node, the numbers of data types of data, respectively, at at least one given string position in each of the plurality of data strings; and classifying, based on the numbers of the data types respectively summed at the at least one given string position in the summing step, the plurality of data strings into a plurality of child nodes, for the respective data types at a given string position.

According to the aspect, the plurality of data strings are classified into a plurality of groups for the respective data types at a given string position determined based on the numbers of the data types respectively summed at the at least one given string position. Therefore, the plurality of data strings are classified at the string position determined in accordance with the characteristics (data types) of the data strings. Accordingly, it is possible to generate a data structure that can realize a stable search speed in accordance with the characteristics of the data strings. It should be noted that in the summing step described above, the numbers of the data types of data may be respectively summed at every string position of each of the plurality of data strings.

In another aspect, in the classifying step, a string position where the numbers of the data types respectively summed in the summing step are equal to each other or close to an equal value is specified, and the plurality of data strings classified in the parent node are classified into the plurality of child nodes, for the respective data types at the specified string position.

According to the aspect, the plurality of data strings are classified equally or substantially equally based the numbers of the data types respectively summed at the at least one string position. Therefore, the plurality of data strings are classified in a good balance, independently of the characteristics of the data strings. Therefore, it is possible to generate a data structure that can realize a stable search speed, independently of the characteristics of the data strings.

In another aspect, the method further includes the step of controlling of recursively repeating a series of steps consisting of the summing step and the classifying step, using each child node created as a result of the classification in the classifying step as a parent node.

According to the aspect, using a created child node as a parent node, a plurality of data strings classified into the parent node are further classified based on the numbers of the data types respectively summed at the at least one string position. By this step being repeated, it is possible to generate a data structure that can realize a further stable search speed, in accordance with the characteristics of the data strings. In a case where a plurality of data string are equally or substantially equally classified, the generated data structure tree has a balanced shape as a whole. Accordingly, it is possible to generate a data structure that can realize a further stable search speed, independently of the characteristics of the data strings.

In another aspect, the controlling step recursively repeats the series of steps until each child node includes only one data string.

According to the aspect, a child node (leaf node) includes only on data string. Therefore, by causing a leaf node of the generated data structure to correspond to a data string, one to one, it is possible to generate a data structure that specifies a data string.

In another aspect, each data string is a bit string including a bit expressed by 0 or 1. In this case, in the summing step, with respect to the plurality of data strings classified in the parent node, the numbers of bits 0 and the number of bits 1, each bit 0 and each bit 1 corresponding to the respective data types, are respectively summed at the at least one given bit position in each of the plurality of data strings, and in the classifying step, based on the number of bits 0 and the number of bits 1, which are respectively summed in the summing step, the plurality of data strings are classified into two child nodes, in accordance with whether the bit at a given bit position is 0 or 1.

According to the aspect, since each data string is a bit string, the data strings can be classified into two types of groups, depending on whether the bit at a given bit position is 0 or 1. Accordingly, the generated data structure has a binary tree shape, and has a balanced shape. As a result, it is possible to generate a data structure that can realize a stable search speed, independently of the characteristics of the data strings.

In another aspect, the method for generating a tree-type data structure composed of a plurality of data strings is as follows. That is, the method includes a calculation step of calculating, with respect to a plurality of data strings classified in a parent node, data patterns in a given string range in each of the plurality of data strings, and a classifying step of classifying, based on the data patterns, the plurality of data strings into a plurality of child nodes such that each child node includes an equal number or a number close to the equal value of data strings.

According to the aspect, a plurality of data strings are equally or substantially equally classified, based on the data patterns in a given string range of the data strings. Therefore, the plurality of data strings are classified in a good balance, independently of the characteristics of the data strings. Accordingly, it is possible to generate a data structure that can realize a stable search speed, independently of the characteristics of the data strings.

In another aspect, the method for generating a tree-type data structure composed of a plurality of data strings is as follows. That is, the method includes a string position specifying step of specifying, with respect to a plurality of data strings classified in a parent node, a string position based on a predetermined algorithm, and a classifying step of classifying the plurality of data strings into a plurality of child nodes for respective data types at the string position specified in the string position specifying step.

According to the aspect, the plurality of data strings are not sequentially classified for the respective data types at each string position, starting from a string position at the beginning of each data string, but for the respective data types at the string position specified based on the predetermined algorithm. Accordingly, even when front portions of the plurality of data strings may resemble each other, it is possible to generate a data structure that can realize a stable search speed.

In the above, an exemplary method for generating a data structure has been described as a configuration of the present embodiment. However, the present embodiment may be configured as a data structure generated by the method, or as a library having the above data structure, or as a computer-readable storage medium having stored therein a game program that uses the above library when performing a predetermined game processing. Further, the present embodiment may be configured as an information processing apparatus that generates the data structure, an information processing system that generates the data structure, or a computer-readable storage medium having stored therein an information processing program that generates the data structure.

According to the present embodiment, it is possible to provide a method and the like for generating a data structure that realizes a stable search speed, independently of the characteristics of data strings.

These and other features, aspects and advantages of certain exemplary embodiments will become more apparent from the following detailed description when taken in conjunction with the accompanying drawings.

DETAILED DESCRIPTION OF NON-LIMITING EXAMPLE EMBODIMENTS (One Embodiment)

Hereinafter, an embodiment will be described with reference to the drawings. Here, as an embodiment, an exemplary information processing apparatus will be described. However, the present embodiment is not limited to the information processing apparatus, and may be an information processing system that realizes features of the information processing apparatus, an information processing method to be performed in the information processing apparatus, or a computer-readable storage medium having stored therein an information processing program executed by the information processing apparatus.

(Hardware Configuration)

Figure 1:
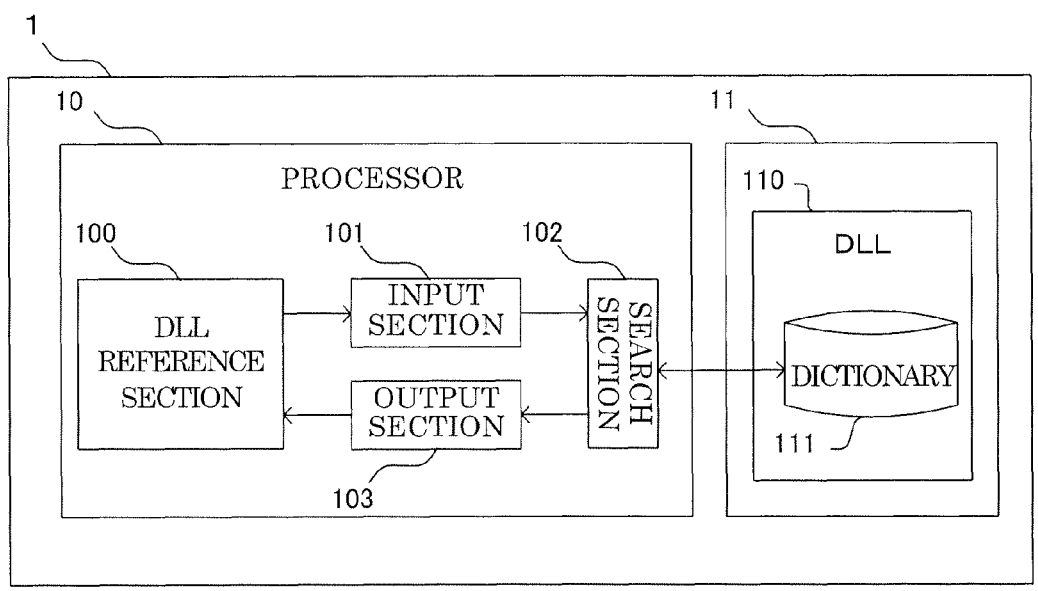
FIG. 1 is a block diagram showing a non-limiting example of a configuration of a game apparatus 1.

First, a game apparatus 1, which is an example of an information processing apparatus, will be described with reference to FIG. 1. The game apparatus 1 according to the present embodiment uses a dynamic link library (hereinafter referred to as DLL) when executing an information processing program (for example, a game program). As shown in FIG. 1, the game apparatus 1 includes a processor 10, and a memory 11. A DLL 110 is stored in the memory 11.

The DLL 110 is a library that includes functions (program modules) that are dynamic-linked when a game program is executed, and is stored in a storage device (not shown) in the game apparatus 1. The DLL 110 includes a dictionary 111.

The dictionary 111 has a tree-type data structure in which pieces of character string data that indicate symbols (function names) of a plurality of functions in the DLL 110 are stored as search keys, and in which a symbol of each function is associated with its corresponding address.

The processor 10 includes, as its operational components, a DLL reference section 100, an input section 101, a search section 102, and an output section 103. The processor 10 operates as the DLL reference section 100, the input section 101, the search section 102, and the output section 103, by executing, for example, a game program stored in a main memory (not shown) of the game apparatus 1.

In order to obtain an address of a target function in the DLL 110 to be used in executing the game program, the DLL reference section 100 issues, to the input section, 101 an instruction of searching the address of the function.

The input section 101 inputs, to the search section 102, a symbol (character string) of the function to be searched for that has been instructed by the DLL reference section 100.

Based on the character string inputted by the input section 101, the search section 102 searches the dictionary 111 for data, the dictionary having a tree-type data structure, and outputs a result of the search to the output section 103.

Based on the search result from the search section 102, the output section 103 outputs, to the DLL reference section 100, an address that corresponds to the character string inputted in the input section 101. Accordingly, the DLL reference section 100 can obtain the address of the function having the targeted operational feature.

Figure 2:
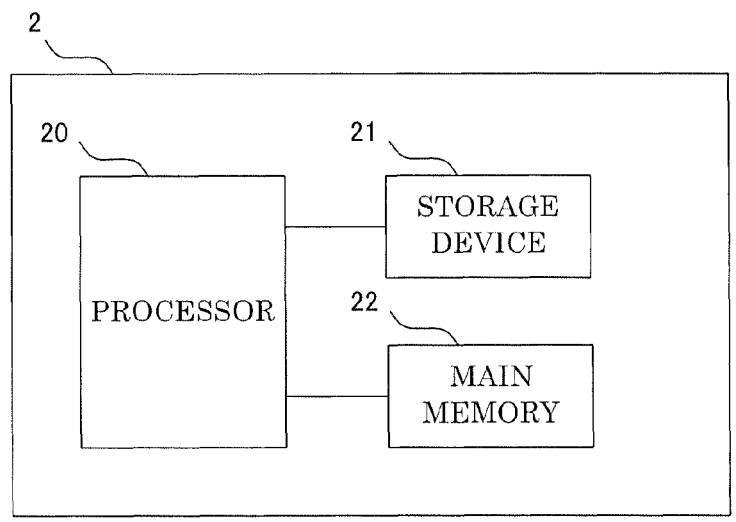
FIG. 2 is a block diagram showing a non-limiting example of a configuration of a developed device 2.

Next, with reference to FIG. 2, a developed device 2, which is an example of an information processing apparatus that generates the dictionary 111 in the DLL 110, will be described.

As shown in. FIG. 2, the developed device 2 includes a processor 20, a storage device 21, and a main memory 22. A computer program to be executed by the processor 20 is stored in the storage device 21, and the computer program and other data are temporarily stored in the main memory 22. The processor 20 of the developed device 2 generates a data structure (the dictionary 111) of the present embodiment by executing the computer program. Various processes performed by the processor 20 of the developed device 2 will be described in detail later. First, an outline of a data structure generation method of the present embodiment will be described.

(Outline of the Data Structure Generation Method)

With reference to FIG. 3 to FIG. 7, an outline of a method for generating a data structure of the dictionary 111 according to the present embodiment will be described. Hereinafter, as search keys (symbols of functions) forming a tree-type data structure of the dictionary 111, eight pieces of character string data, that is, 'aaaaaaa', 'aaaaaab', 'aaaaabb', 'aaaabbb', 'aaabbbb', 'aabbbbb', 'abbbbbb', and 'bbbbbbb', are used as an example.

Figures 3, 4:
FIG. 3 illustrates a non-limiting example of a data structure generation method.
FIG. 4 illustrates a non-limiting example of a data structure generation method.

As shown in FIG. 3, in the present embodiment, first, each character string data is converted into bit string data composed of 0s and 1s. Since 8 bits are allocated to one character, each character string data whose number of characters is 7 is converted into 56-bit string data.

Next, as shown in FIG. 4, with respect to all pieces of bit string data, the number of bits 0 and the number of bits 1, each bit 1 and each bit 0 corresponding to the types of bit data, are respectively summed at every bit position in each piece of bit string data. Therefore, for example, at the 1st bit position, the summed number of bits 0 is 8, the summed number of bits 1 is 0; and at the 7th bit position, the summed number of bits 0 is 7, and the summed number of bits 1 is 1.

Figure 5:
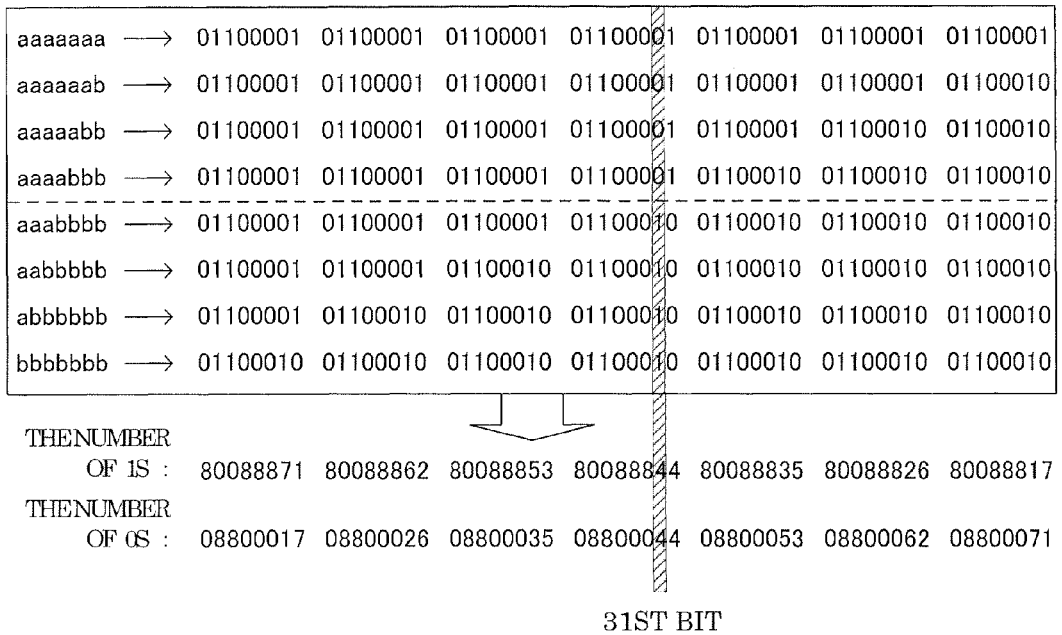
FIG. 5 illustrates a non-limiting example of a data structure generation method.

Next, at each bit position, the summed number of bits 0 is compared with the summed number of bits 1. Then, a bit position where the numbers are equal to each other or are close to the equal value (hereinafter referred to as equal bit position) is specified. Specifically, as shown in FIG. 5, the 31st bit position where the number of bits 0 is 4, and the number of bits 1 is 4 is specified as an equal bit position. In FIG. 5, since also at the 32nd bit, the number of bits 0 is 4 and the number of bits 1 is 4, the 32nd bit is also a bit position where the number of bits 0 and the number of bits 1 are equal to each other. However, as in this case, when there are a plurality of bit positions where the number of bits 0 and the number of bits 1 are equal to each other, one bit position may be specified as an equal bit position in accordance with a predetermined rule (for example, the bit position in a foremost position among candidate positions may be specified as an equal bit position). It should be noted that, in a case where a bit position where the number of bits 0 and the number of bits 1 are equal to each other is to be specified, even when there eventually exist a plurality of bit positions where the number of bits 0 and the number of bits 1 are equal to each other, if a first bit position where the number of bits 0 and the number of bits 1 becomes equal to each other can be specified, the specifying operation may be ended at that time.

Next, the pieces of bit string data are classified into two groups, by the type of bit data (that is, bit 0 or bit 1) at the equal bit position. Specifically, as shown in FIG. 5, the pieces of bit string data are classified into a group in which bit data at the 31st bit position (equal bit position) is 0 (hereinafter referred to as node n1) and a group in which bit data at the 31st bit position is 1 (hereinafter referred to as node n2). That is, pieces of character string data 'aaaaaaa', 'aaaaaab', 'aaaaabb', and 'aaaabbb' are classified into node n1, and pieces of character string data 'aaabbbb', 'aabbbbb', 'abbbbbb', 'bbbbbbb' are classified into node n2.

Figure 6:
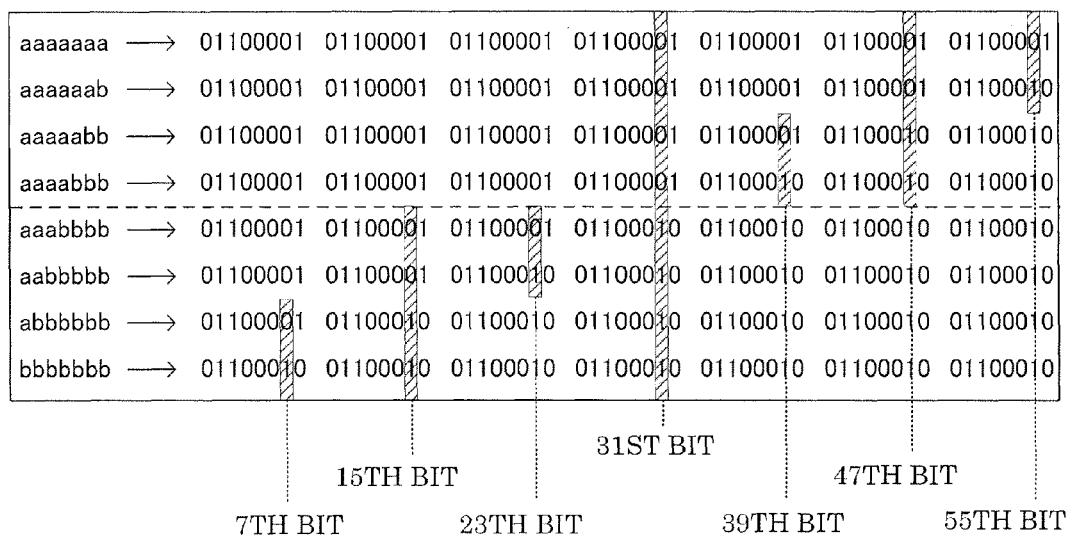
FIG. 6 illustrates a non-limiting example of a data structure generation method.

Next, with respect to each group (node), for all pieces of bit string data constituting the group, at each bit position (bit position different from the 31st bit position) that is different from the bit position already used for classifying pieces of bit string data, the summed number of bits 0 is similarly compared with the summed number of bits 1, to specify an equal bit position. Then, depending on whether the type of bit data at the equal bit position is bit 0 or bit 1, the pieces of bit string data of the group is further classified into two groups. Specifically, as shown in FIG. 6, pieces of character string data classified in node n1 are further classified into a group in which bit data at the 47th bit position is 0 (hereinafter referred to as node n3) and a group in which bit data at the 47th bit position is 1 (hereinafter referred to as node n4). Similarly, pieces of character string data classified in node n2 are further classified into a group in which bit data at the 15th bit is 0 (hereinafter referred to as node n5), and a group in which bit data at the 15th bit is 1 (hereinafter referred to as node n6).

Thereafter, until a group includes only one piece of character string data, the above-described classification is performed. Specifically, as shown in FIG. 6, pieces of character string data classified in node n3 are further classified into a group in which bit data at the 55th bit position is 0 (hereinafter referred to as node n7) and a group in which bit data at the 55th bit position is 1 (hereinafter referred to as node n8). Then, pieces of character string data classified in node n4 are further classified into a group in which bit data at the 39th bit position is 0 (hereinafter referred to as node n9) and a group in which bit data at the 39th bit position is 1 (hereinafter referred to as node n10). Pieces of character string data classified in node n5 are further classified into a group in which bit data at the 23th bit position is 0 (hereinafter referred to as node n11) and a group in which bit data at the 23th bit is 1 (hereinafter referred to as node n12). Pieces of character string data classified in node n6 are further classified into a group in which bit data at the 7th bit position is 0 (hereinafter referred to as node n13) and a group in which bit data at the 7th bit position is 1 (hereinafter referred to as node n14).

Figure 7:
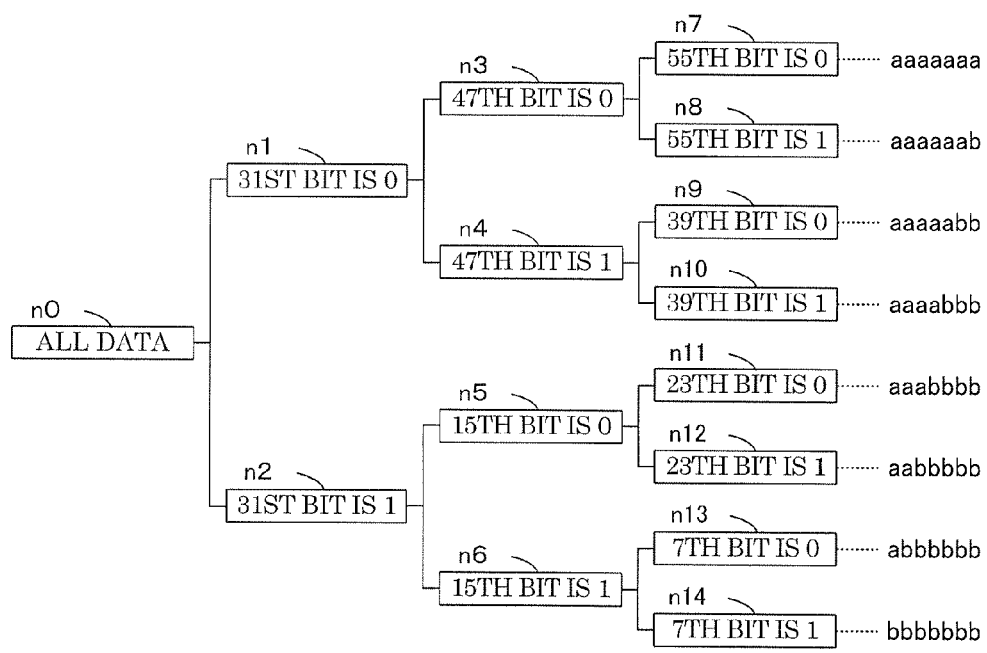
FIG. 7 is a conceptual diagram showing a non-limiting example of a data structure of classified character string data.
Figure 11:
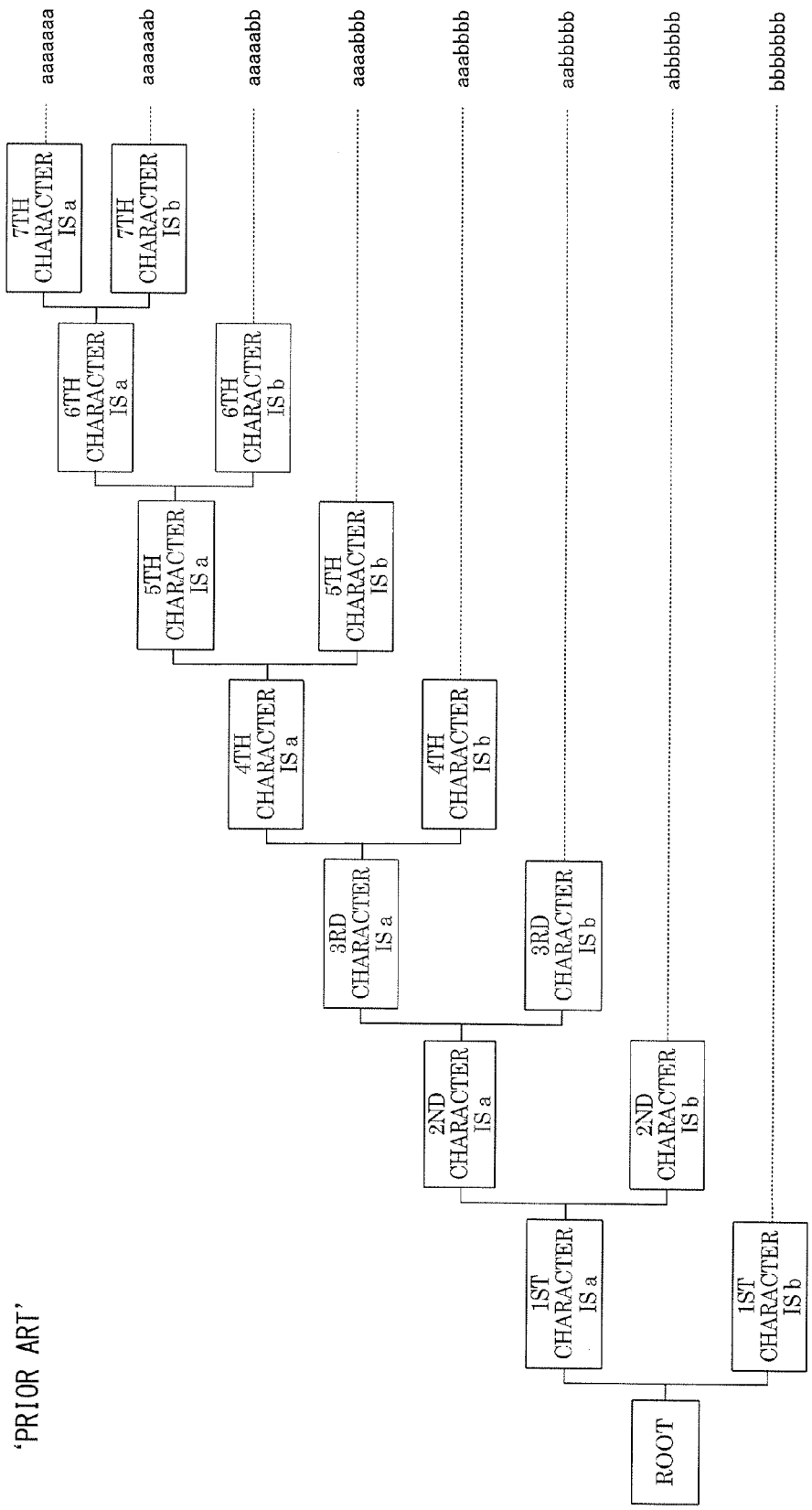
FIG. 11 is a conceptual diagram showing a non-limiting example of a conventional data structure using a patricia tree.

FIG. 7 is a conceptual diagram showing, by means of a tree structure, pieces of character string data classified into groups (nodes) as described above. It should be noted that node n0 is a group composed of all pieces of data. As shown in FIG. 7, the data structure tree of the dictionary 111 according to the present embodiment is different from the conventional data structure tree shown in FIG. 11, and has a balanced-shape. Specifically, each piece of character string data has an equal number of branches, that is 3. Accordingly, the speed for searching the pieces of character string data is stable, independently of the characteristics of the pieces of character string data.

(Outline of the Data Structure)

Figure 8:
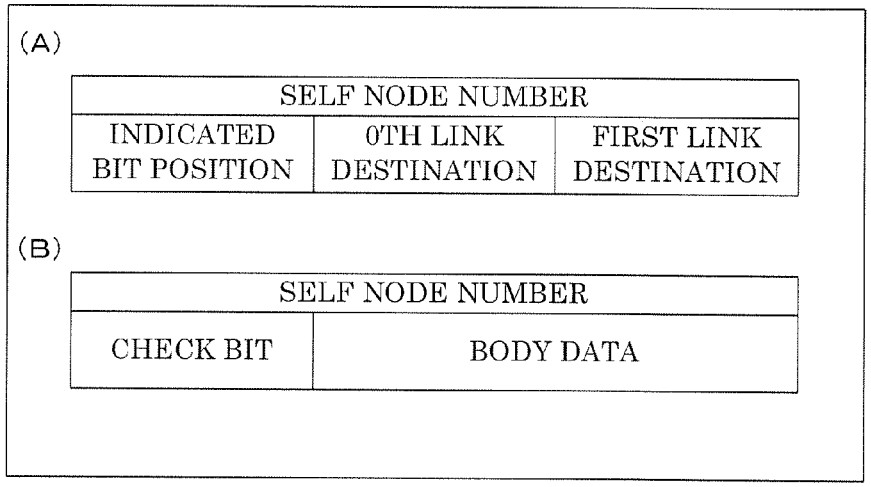
FIG. 8 is a conceptual diagram showing a non-limiting example of node data.

Next, with reference to FIG. 8, an outline of the data structure of the dictionary 111 generated by the generation method described above. The data structure of the dictionary 111 according to the present embodiment is a hierarchical-type tree structure, and the data structure of the dictionary 111 is represented by node data that indicates nodes, which are nodal points in the tree. The node data includes leaf node data indicating a node that is located in a lowest layer of the tree and has no node in its immediately lower layer, and internal node data indicating a node other than the leaf node. (A) of FIG. 8 shows an example of internal node data and (B) of FIG. 8 shows an example of leaf node data.

As shown in (A) of FIG. 8, the internal node data is composed of data indicating a self node number, an indicated bit position, a 0th link destination, and a first link destination.

The self node number is data indicating an identifier of the self node. The indicated bit position is data indicating at which string position (bit position) the pieces of character string data (bit string data) that are to be classified and included in the self node are to be classified (that is, equal bit position). The 0th link destination is data indicating a node number of a group (node) into which bit string data whose bit data at the indicated bit position is 0 is to be classified. Similarly, the first link destination is data indicating a node number of a group (node) into which bit string data whose bit data at the indicated bit position is 1 is to be classified. Therefore, each internal node has two link destination nodes. As a result, a tree-type data structure is formed.

As shown in (B) of FIG. 8, the leaf node data is composed of data indicating a self node number, a check bit, and body data.

The body data is data indicating character string data to be classified. The check bit is data for checking whether the bit data of the body data is correct. It should be noted that the leaf node may not have the check bit.

Figure 9:
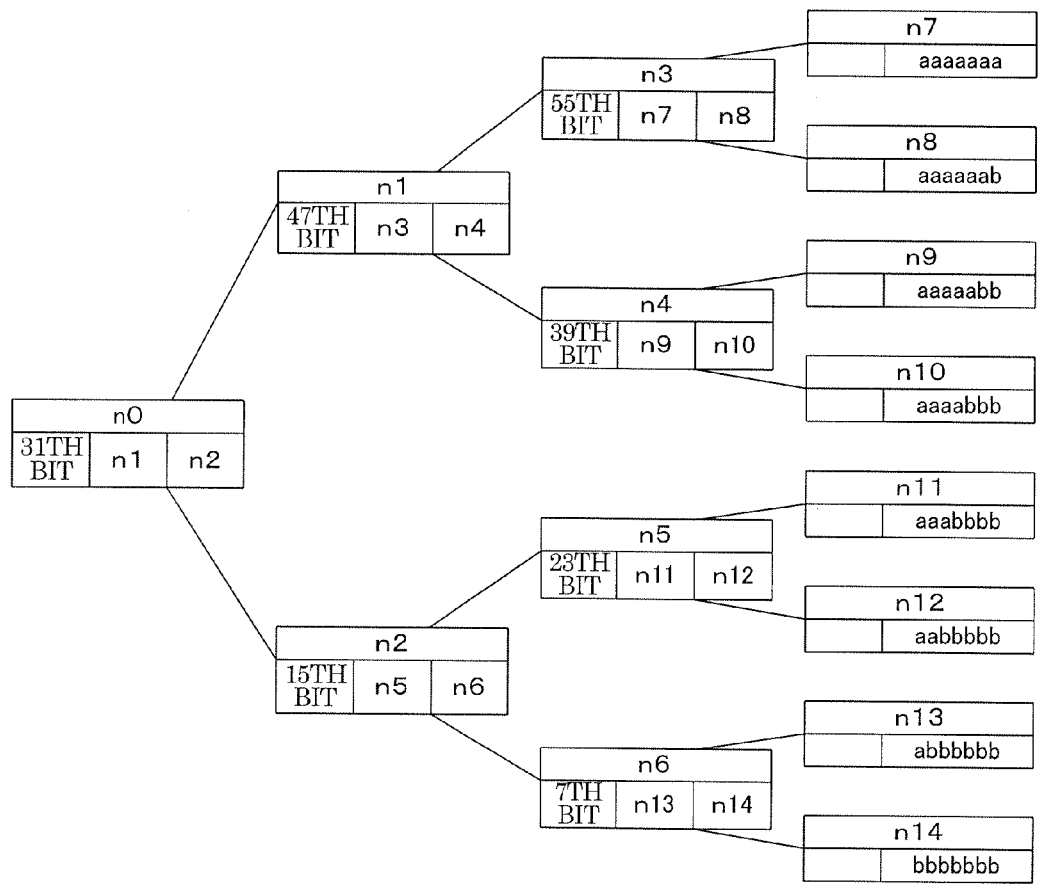
FIG. 9 is a conceptual diagram showing a non-limiting example of data structure represented by node data.

As described above, each internal node includes pieces of data each indicating the node number of a node that is linked thereto and located immediately therebelow, and each leaf node includes its body data. Accordingly, each piece of character string data is classified into a tree form, and is stored as the body data in its corresponding node in the lowest layer. Specifically, as shown in. FIG. 7, the data structure of the dictionary 111 composed of the classified pieces of character string data is represented by node data shown in FIG. 9.

(Flow of Data Structure Generation Process)

Figure 10:
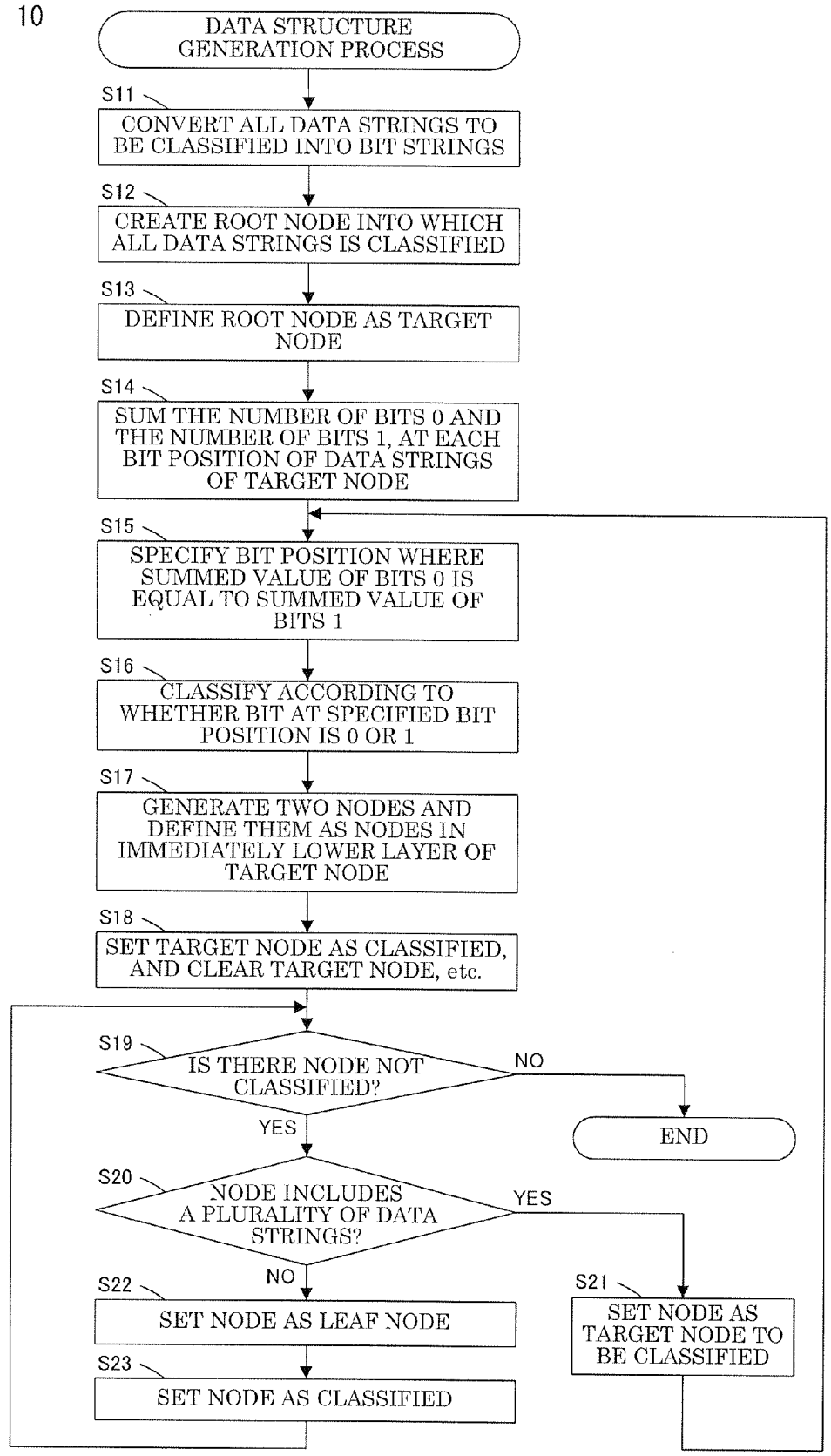
FIG. 10 is a flow chart of a non-limiting example of a flow of a data structure generation process.

Next, a data structure generation process performed by the processor 20 of the developed device 2 will be described with reference to FIG. 10. First, the processor 20 initializes the main memory 22 and loads, to the main memory 22, various types of programs and various types of data from the storage device 21 and the like. Then, by executing the various programs, the processor 20 performs the process of the flow chart shown in FIG. 10.

In step S11, the processor 20 converts all pieces of character string data to be classified, into pieces of bit string data, and stores the converted pieces of bit string data in the main memory 22. Then, the process advances to step S12.

In step S12, the processor 20 creates a root node, which is a node (group), into which all pieces of character string data to be classified are classified. As node data indicating the root node, only data indicating its self node number is generated. Then, the process advances to step S13.

In step S13, the processor 20 stores, as target node data, the data indicating the node number of the root node in the main memory 22. Then, the process advances to step S14.

In step S14, with respect to all pieces of bit string data corresponding to the all pieces of character string data classified in the node indicated by the target node data stored in the main memory 22, the processor 20 sums the number of bits 0 and the number of bits 1 at each bit position in each piece of bit string data, and stores, as pieces of summed value data, the summed values at each bit position in the main memory 22. Then, the process advances to step S15.

In step S15, based on the pieces of summed value data stored in the main memory 22, the processor 20 specifies a bit position where the number of bits 0 and the number of bits 1 are equal to each other or are close to the equal value, and stores the bit position as equal bit position data in the main memory 22. Then, the process advances to step S16.

In step S16, the processor 20 classifies all the pieces of character string data classified in the node indicated by the target node data stored in the main memory 22, into a node whose bit data type is bit 0 (hereinafter referred to as bit 0 node) and a node whose bit data type is bit 1 (hereinafter referred to as bit 1 node) at the bit position indicated by the equal bit position data stored in the main memory 22. Then, the process advances to step S17.

In step S17, the processor 20 generates a bit 0 node and a bit 1 node, and defines each of these nodes as an node in an immediately lower layer of the node indicated by the target node data stored in the main memory 22. Specifically, first, the processor 20 generates, as node data representing a bit 0 node, data indicating a self node number of the bit 0 node, and generates, as node data representing a bit 1 node, data indicating a self node number of the bit 1 node. For these node numbers, numbers that do not overlap already generated node numbers are selected. Then, the processor 20 stores the equal bit position data stored in the main memory 22 as data indicating an indicated bit position, stores data indicating the node number of the bit 0 node as data indicating a 0th link destination, and stores data indicating the node number of the bit 1 node as data indicating a first link destination, for the node data of the node indicated by the target node data stored in the main memory 22. Then, the process advances to step S18.

In step S18, the processor 20 sets to ON a classified flag data (not shown) for the node indicated by the target node data stored in the main memory 22, and clears the target node data, the summed value data, the equal bit position data stored in the main memory 22. Then, the process advances to step S19.

In step S19, by determining whether the classified flag data of the generated node is ON, the processor 20 determines whether there is a node which has not been classified. When a result of the determination is YES, the process advances to step S20, and when a result of the determination is NO, the process ends. That is, when all the nodes have been classified, the process ends.

In step S20, the processor 20 first specifies one node whose classified flag data is not set to ON. Specifically, the processor 20 specifies one node whose classified flag data is not set to ON, in accordance with a predetermined rule. For example, in a case where there are a plurality of nodes each of which classified flag data is not set to ON, one node may be specified by a predetermined rule (for example, in an ascending order of the node numbers). Then, the processor 20 determines whether there are a plurality of pieces of character string data classified in the specified node. When a result of the determination is YES, the process advances to step S21, and when a result of the determination is NO, the process advances to step S22.

In step S21, the processor 20 stores, in the main memory 22, data indicating the node number of the node specified in step S20, as target node data. Then, the process returns to step S14.

In step S22, the processor 20 sets the node specified in step S20 as a leaf node. Specifically, the processor 20 stores, as body data of the node data of the node specified in step S20, character string data classified into the node, and stores, as a check bit, data for checking the character string data. Then, the process advances to step S23.

In step S23, the processor 20 sets to ON the classified flag data of the node set as a leaf node in step S22. Then, the process returns to step S19.

As described above, according to the data structure generation process of the present embodiment, a node into which a plurality of pieces of character string data are classified is defined as internal node having two nodes in its immediately lower layer (steps S11 to S17, and YES in step S20, step S21, and S14 to S17 in. FIG. 10). Then, when a node which is generated after repeated classification includes only one piece of character string data, the node is defined as a leaf node and the character string data is stored in the leaf node (NO in step S20 and step S22). In a case where pieces of character string data classified in each internal node are to be further classified, the pieces of character string data to be classified are classified into nodes such that each node includes an equal number or a number close to the equal number of pieces of character string data (step S14 to S16). Therefore, the numbers of pieces of character string data included in the respective two nodes generated in the immediately lower layer of each internal node are equal to each other or are close to the equal value. Therefore, the shape of the data structure tree represented by the node data is balanced. Accordingly, it is possible to generate a data structure that can realize a stable search speed, independently of the characteristics of the pieces of character string data. Although not described specifically, each piece of character string data is data to be used as a search key for the dictionary 111, and data corresponding to the search key (data indicating the address corresponding to the symbol of the corresponding function) is also stored in the dictionary 111.

As described in the above embodiment, in a game program that uses much memory, there are cases where a DLL is used in order to reduce the usage amount of memory. The DLL includes a dictionary that associates symbols of a plurality of functions with their corresponding addresses. When a function is called, the dictionary is searched, using the symbol of the function as a search key, to obtain the address of the function. Then, for example, in a case where the game program is described by programming language C++, a character string (search key) indicating a symbol of a function tends to be long and front portions of character strings tend to resemble each other. However, since the shape of the data structure tree of the dictionary is balanced in the present embodiment, a stable search speed can be realized independently of the characteristic of a character string (search key). Accordingly, the execution speed of the game program using the DLL can be stabled. Further, according to the data structure of the dictionary of the present embodiment, not limited to a case where the search is performed using a character string as a search key as described above, a stable search speed can be realized, independently of the characteristic of the data string which serves as a search key.

In the above embodiment, each character string (symbol of function) serving as a search key has the same number of characters. However, the number of characters may be different. In this case, for example, based on the number of characters of a character string that has a greatest number of characters, when a character string having a smaller number of characters is converted into a bit string, bits 0 may be added in a rear bit position thereof, so as to complement the lacked number of characters.

Further, in the above embodiment, the numbers of the respective types of bit data are summed at every bit position. However, the summation may be stopped when the summed numbers of the respective bit data types have become equal to each other at a given bit position.

Further, in the above embodiment, pieces of character string data which have been converted into pieces of bit string data are classified based on the number of bits 0 and the number of bits 1, each bit 1 and each bit 1 corresponding to bit types, respectively summed at each bit position. However, the pieces of character string data may be classified based on the numbers of the respective bit types summed not at each bit position but in a range of a plurality of successive bits. For example, the pieces of character string data may be classified based on the numbers of the respective bit types in a range consisting of two successive bits. In this case, the bit types include four types of '00', '01', '10', and '11'. Thus, the pieces of character string data are classified into four groups for the respective bit types, where the numbers of the respective four bit types summed in each bit range become equal to each other, or close to the equal value.

Further, in the above embodiment, the pieces of character string data are converted into pieces of bit string data and then classified based on the bit data types (bit 0 and bit 1). However, for example, in a case where data types of character string data are limited to several types, the pieces of character string data may be directly classified, without being converted into pieces of bit string data.

Further, in the above embodiment, the dictionary 111 in which a symbol of each function is provided as a character string, which serve as a search key, and in which the address of the function is obtained based on the search key. However, the dictionary 111 is not limited to such a dictionary. That is, the data string which serves as a search key is not limited to character string data, and may be, for example, bit string data. A data string obtained based on a search key is not limited to the information indicating the address of the function.

Further, in the above embodiment, the DLL 110 is a dynamic link library. However, the DLL 10 may be a static library including the dictionary 111.

Further, in the above embodiment, a bit position is specified based on the numbers of the respective bit data types summed at each bit position, and pieces of character string data are classified for the bit data types at the specified bit position. However, a bit position may be specified in accordance with a predetermined algorithm using a predetermined function or a random number, and pieces of character string data may be classified based on the data types at the specified bit position.

Further, in the above embodiment, a single developed device 2 executes the above described data structure generation process. However, in a developed system including a plurality of devices capable of wired or wireless communication, the above process may be shared by the plurality of devices.

Further, in the above embodiment, components such as the game apparatus 1 and the developed device 2 are merely an example, and they may have other forms and may include other components. The order of the process steps, the set values, the values used in determinations used in the above-described information processing are merely an example, and other orders and values may be used.

Various types of information processing program executed in the developed device 2 of the above embodiment may be provided to the developed device 2 not only via a storage medium such as the main memory 22, but also via wired or wireless communication lines. Further, the above programs may be stored in advance in a nonvolatile storage device provided in the developed device 2. As an information storage medium for storing the above programs, a CD-ROM, DVD, or an optical disc storage medium, a flexible disk, a hard disk, a magnetic optical disk, a magnetic tape, or the like may be used instead of a nonvolatile memory. Further, as an information storage medium for storing the above programs, a volatile memory for temporarily storing the programs may be used.

While the present embodiment has been described in detail, the foregoing description is in all aspects illustrative and not restrictive. It is understood that various other modifications and variations can be devised.

What is claimed is:

1. A method for generating a tree-type data structure composed of a plurality of data strings, comprising:
   summing, using at least one processor, with respect to a plurality of data strings classified in a parent node, numbers of data types of data, respectively, at least one given character position in each of the plurality of data strings; and
   classifying, based on the numbers of the data types respectively summed at the at least one given character position in the summing, the plurality of data strings into a plurality of child nodes, for the respective data types at a given character position,
   wherein in the classifying, a character position where the numbers of the data types respectively summed in the summing are equal to each other or close to an equal value is specified, and the plurality of data strings classified in the parent node are classified into the plurality of child nodes, for the respective data types at the specified character position.

2. The method according to claim 1, further including:
   controlling of recursively repeating a series of operations including the summing and the classifying, using each child node created as a result of the classification in the classifying as a parent node.

3. The method according to claim 2, wherein
   the controlling recursively repeats the series of operations until each child node includes only one data string.

4. The method according to claim 1, wherein
   each data string is a bit string including a bit expressed by 0 or 1,
   in the summing, with respect to the plurality of data strings classified in the parent node, the numbers of bits 0 and the number of bits 1, each bit 0 and each bit 1 corresponding to the respective data types, are respectively summed at the at least one given bit position in each of the plurality of data strings, and
   in the classifying, based on the number of bits 0 and the number of bits 1, which are respectively summed in the summing, the plurality of data strings are classified into two child nodes, in accordance with whether the bit at a given bit position is 0 or 1.

5. The method according to claim 1, wherein
   in the summing, the numbers of the data types of data are respectively summed at every character position in each of the plurality of data strings.

6. A non-transitory computer readable storage medium having instructions stored therein, which when executed by a processor, causes the processor to generate a tree-type data structure, wherein
   a plurality of data strings classified in a parent node of the tree-type data structure is classified, based on numbers of data types of data respectively summed at least one given character position in each of the plurality of data strings, into a plurality of child nodes of the tree-type data structure, for the respective data types at a given character position,
   wherein in the classifying, a character position where the numbers of the data types respectively summed in the summing are equal to each other or close to an equal value is specified, and the plurality of data strings classified in the parent node are classified into the plurality of child nodes, for the respective data types at the specified character position.

7. The non-transitory computer readable storage medium of claim 6, wherein the instructions further cause the processor to generate a library including a plurality of functions and a plurality of addresses associated with the plurality of data strings indicating symbol names of the plurality of functions and associated with the symbol names, wherein
   a data structure of the plurality of data strings indicating the symbol names is the tree- type data structure.

8. The non-transitory computer-readable storage medium of claim 7 having stored therein a game program, which, when executed by the processor, performs game processing using the library.

9. An information processing apparatus comprising at least one processor and configured to generate a tree-type data structure composed of a plurality of data strings, comprising:
   a summing section configured to, using at least one processor, sum, with respect to a plurality of data strings classified in a parent node, numbers of data types of data, respectively, at least one given character position in each of the plurality of data strings; and
   a classification section configured to classify, based on the numbers of the data types respectively summed at the at least one given character position by the summing section, the plurality of data strings into a plurality of child nodes, for the respective data types at a given character position,
   wherein in the classifying, a character position where the numbers of the data types respectively summed in the summing are equal to each other or close to an equal value is specified, and the plurality of data strings classified in the parent node are classified into the plurality of child nodes, for the respective data types at the specified character position.

10. An information processing system configured to generate a tree-type data structure composed of a plurality of data strings, comprising:
    a memory; and
    at least one processor configured to:
    sum, with respect to a plurality of data strings classified in a parent node stored in the memory, numbers of data types of data, respectively, at least one given character position in each of the plurality of data strings; and
    classify, based on the numbers of the data types respectively summed at the at least one given character position by the summing section, the plurality of data strings into a plurality of child nodes, for the respective data types at a given character position,
    wherein in the classifying, a character position where the numbers of the data types respectively summed in the summing are equal to each other or close to an equal value is specified, and the plurality of data strings classified in the parent node are classified into the plurality of child nodes, for the respective data types at the specified character position.

11. A non-transitory computer-readable storage medium having stored therein an information processing program to be executed by a computer of an information processing apparatus that generates a tree-type data structure composed of a plurality of data strings, the program causing the computer to perform operations comprising:

summing, with respect to a plurality of data strings classified in a parent node, numbers of data types of data, respectively, at least one given character position in each of the plurality of data strings; and classifying, based on the numbers of the data types respectively summed at the at least one given character position by the summing, the plurality of data strings into a plurality of child nodes, for the respective data types at a given character position, wherein in the classifying, a character position where the numbers of the data types respectively summed in the summing are equal to each other or close to an equal value is specified, and the plurality of data strings classified in the parent node are classified into the plurality of child nodes, for the respective data types at the specified character position.

* * * * *